(No Model.)
J. PUTMAN.
NUT LOCK.
No. 423,441. Patented Mar. 18, 1890.
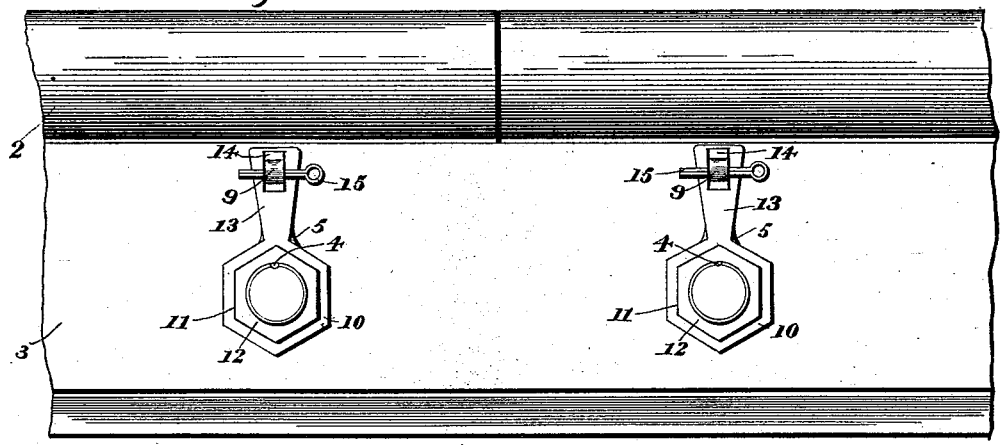
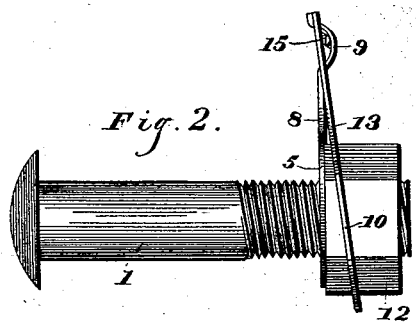
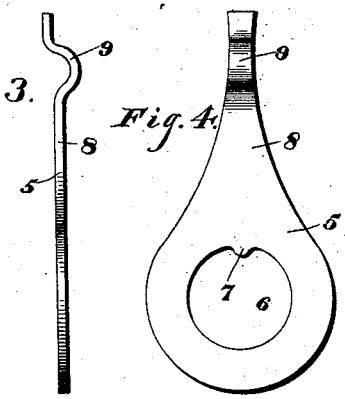
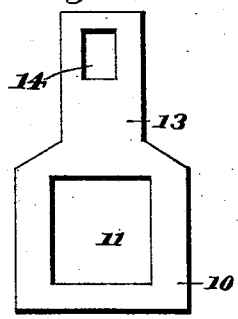
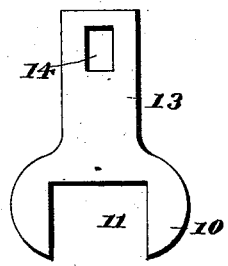
Witnesses:
Inventor,
John Putman,
By his Attorneys,

UNITED STATES PATENT OFFICE.

JOHN PUTMAN, OF BEARDSTOWN, ILLINOIS, ASSIGNOR TO MARTHA A. PUTMAN, OF SAME PLACE, AND JOSEPH F. BLACK, OF VIRGINIA, ILLINOIS.

NUT-LOCK.

SPECIFICATION forming part of Letters Patent No. 423,441, dated March 18, 1890.

Application filed July 30, 1889. Serial No. 319,150. (No model.)

*To all whom it may concern:*

Be it known that I, JOHN PUTMAN, a citizen of the United States, residing at Beardstown, in the county of Cass and State of Illinois, have invented a new and useful Nut-Lock, of which the following is a specification.

This invention has relation to nut-locks; and the invention consists in certain novel features of construction hereinafter specified, and particularly pointed out in the claim.

Referring to the drawings, Figure 1 is a side elevation of a rail-joint, the bolts of which are provided with nut-locks constructed in accordance with my invention. Fig. 2 is a side elevation of the bolt, nut, and lock detached. Fig. 3 is an edge view of the washer. Fig. 4 is a front elevation of the same. Figs. 5 and 6 are details in plan of modified forms of lock-plates.

Like numerals of reference indicate like parts in all the figures of the drawings.

In practicing my invention I employ an ordinary bolt 1, inserted in the usual manner through the rails 2 and fish-plate 3. The threaded end of the bolt 1 is provided with a longitudinal groove 4.

5 represents the washer-plate, and the same is provided with a central perforation 6 and an inwardly-extending lug or pin 7, designed to take into the groove 4 and prevent any independent movement of the washer and bolt. From the edge of the washer 5 there extends a radial arm 8, and in the same near its upper end is formed an offset or eye 9.

10 represents the lock-plate, and the same is provided with an opening 11, corresponding in shape with and approximating the size of the nut 12. The opening 11, as will be understood, receives the nut, and the plate 10 is provided with a lateral arm 13, having an opening 14 near its upper end of a size and at a point adapted to receive the eye 9 of the washer.

The manner of applying my invention is as follows: The bolt is first mounted in position, after which the washer is mounted over the bolt and snugly against the fish-plate. The nut is then screwed home against the washer and the locking-plate mounted over the nut and in such a position with relation to the washer that the opening 14 is opposite the eye 9. The arm 13 of the locking-plate is pressed to the rear, so that the eye 9 takes through the same, and between the eye 9 and the outer surface of the washer I insert a split pin 15. It will thus be seen that the bolt, washer, nut, and lock-plate are all rigidly connected together, and that in a simple manner. I prefer to form the lock-plate of spring sheet metal, so that there is a constant tendency upon the part of the arm 13 to draw outwardly and thus maintain the split pin in position.

In Fig. 5 I vary the lock-plate by forming the opening 11 square, as for a square nut. In Fig. 6 I simply form a recess in the lower end of the lock-plate.

Having described my invention, what I claim is—

The combination, with a grooved bolt, of rails and fish-plates for receiving the same, a washer mounted on the bolt and having an opening to receive the same, and a lug extending into the groove and provided with a lateral projection having an eye projecting from the face of the washer, and a lock-plate taking against the nut of a bolt and provided with a lateral arm having an opening receiving the eye, and a key inserted through the eye and against the face of the lock-plate, substantially as specified.

In testimony that I claim the foregoing as my own I have hereto affixed my signature in presence of two witnesses.

JOHN PUTMAN.

Witnesses:
E. M. DALE,
D. C. CARSON.